US012412134B2

(12) United States Patent
Silverstein et al.

(10) Patent No.: US 12,412,134 B2
(45) Date of Patent: Sep. 9, 2025

(54) AD-HOC PSEUDO COMPLETION TASK

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Jeremy R. Fox, Georgetown, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 18/384,079

(22) Filed: Oct. 26, 2023

(65) Prior Publication Data

US 2025/0139577 A1 May 1, 2025

(51) Int. Cl.
| | |
|---|---|
| G06Q 10/063 | (2023.01) |
| G06F 40/279 | (2020.01) |
| G06Q 10/0631 | (2023.01) |
| G06Q 10/10 | (2023.01) |

(52) U.S. Cl.
CPC ......... *G06Q 10/063* (2013.01); *G06F 40/279* (2020.01); *G06Q 10/06311* (2013.01); *G06Q 10/10* (2013.01)

(58) Field of Classification Search
CPC ............. G06Q 10/063; G06Q 10/0631; G06Q 10/06311; G06Q 10/10; G06F 40/279
See application file for complete search history.

(56) References Cited

U.S. PATENT DOCUMENTS

| | | |
|---|---|---|
| 10,360,066 B2 | 7/2019 | Suparna et al. |
| 10,572,594 B2 | 2/2020 | Kakirwar et al. |
| 10,572,954 B2 | 2/2020 | Goodyear et al. |
| 10,705,948 B2 | 7/2020 | Ramasamy et al. |
| 10,733,375 B2 | 8/2020 | Li et al. |
| 11,095,468 B1* | 8/2021 | Pandey ............... H04L 12/1831 |
| 11,113,095 B2 | 9/2021 | Krishnamurthy et al. |

(Continued)

FOREIGN PATENT DOCUMENTS

CN 110490547 11/2019

OTHER PUBLICATIONS

K. Nagao, K. Inoue, N. Morita and S. Matsubara, "Automatic extraction of task statements from structured meeting content," 2015 7th International Joint Conference on Knowledge Discovery, Knowledge Engineering and Knowledge Management (IC3K), Lisbon, Portugal, 2015, pp. 307-315. (Year: 2015).*

(Continued)

*Primary Examiner* — William S Brockington, III
(74) *Attorney, Agent, or Firm* — Rakesh Roy; Andrew D. Wright; Calderon Safran & Wright P.C.

(57) ABSTRACT

Embodiments detect a task keyword related to an offloaded task of a task-giver, train a machine learning (ML) model using the task keyword, determine that the task keyword is similar to a historical task by utilizing the trained ML model, record a user input in response to determining that the task keyword is similar to the historical task, freeze an action execution during a pseudo action before a finality action is executed, provide the recorded user input to the task-giver and requesting approval from the task-giver, and execute the offloaded task using robotic process automation (RPA) in response to receiving approval from the task-giver.

20 Claims, 5 Drawing Sheets

(56) References Cited

U.S. PATENT DOCUMENTS

| | | |
|---|---|---|
| 11,372,380 B2 | 6/2022 | Iyer et al. |
| 11,423,430 B2 | 8/2022 | Griffin |
| 2018/0074931 A1 | 3/2018 | Garcia et al. |
| 2018/0113850 A1 | 4/2018 | Suparna et al. |
| 2018/0218305 A1* | 8/2018 | Shah ................. G06F 21/44 |
| 2019/0042552 A1 | 2/2019 | Johnson et al. |
| 2019/0042561 A1 | 2/2019 | Kakirwar et al. |
| 2019/0129827 A1 | 5/2019 | Ramasamy et al. |
| 2019/0236130 A1 | 8/2019 | Li et al. |
| 2020/0234183 A1 | 7/2020 | Ghatage et al. |
| 2020/0348960 A1 | 11/2020 | Krishnamurthy et al. |
| 2021/0109487 A1 | 4/2021 | Iyer et al. |
| 2021/0287241 A1 | 9/2021 | Griffin |
| 2022/0011732 A1 | 1/2022 | Hall |
| 2022/0019195 A1 | 1/2022 | Yu et al. |
| 2022/0180336 A1 | 6/2022 | Venkatakrishnan et al. |
| 2022/0269265 A1* | 8/2022 | Meyer ................. G05D 1/0027 |
| 2023/0048441 A1* | 2/2023 | Matsuoka ........ G06Q 10/06314 |
| 2023/0290348 A1* | 9/2023 | Rodriguez Bravo . H04M 3/565 |

OTHER PUBLICATIONS

Kalia, Anup, et al. "Identifying business tasks and commitments from email and chat conversations." tech. report, HP Labs, 2013. (Year: 2013).*

Anonymous, "Method and System for Validating Workflow Execution Steps by Analyzing and Comparing Hand Gestures using Wearable Devices", https://ip.com/IPCOM/000244794, Jan. 15, 2016; 3 Pages.

IBM, "IBM Robotic Process Automation", https://www.ibm.com/products/robotic-process-automation, Accessed Jun. 27, 2023; 18 Pages.

* cited by examiner

AD-HOC PSEUDO COMPLETION TASK

BACKGROUND

Aspects of the present invention relate generally to generating a pseudo-completion task.

A user may want to offload a computing task to another user when the user doesn't have the time to complete the computing task. In this situation, when the user offloads the computing task to another user by communicating to the other using through a computing device, the other user takes control of the computing task until the computing task is completed.

SUMMARY

In a first aspect of the invention, there is a computer-implemented method including: detecting, by a processor set, a task keyword related to an offloaded task of a task-giver; training, by the processor set, a machine learning (ML) model using the task keyword related to the offloaded task; determining, by the processor set, that the task keyword is similar to a historical task by utilizing the trained ML model; recording, by the processor set, a user input in response to determining that the task keyword is similar to the historical task, freezing, by the processor set, an action execution during a pseudo action before a finality action is executed; providing, by the processor set, the recorded user input to the task-giver and requesting approval from the task-giver; and executing, by the processor set, the offloaded task using robotic process automation (RPA) in response to receiving approval from the task-giver.

In another aspect of the invention, there is a computer program product including one or more computer readable storage media having program instructions collectively stored on the one or more computer readable storage media. The program instructions are executable to: detect a task keyword related to an offloaded task of a task-giver; train a machine learning (ML) model using the task keyword related to the offloaded task; determine that the task keyword is not similar to a historical task by utilizing the trained ML model; record a user input in response to determining that the task keyword is not similar to the historical task; freeze an action execution during a pseudo action before a finality action is executed; provide the recorded user input to the task-giver and requesting approval from the task-giver; and execute the offloaded task using robotic process automation (RPA) in response to receiving approval from the task-giver.

In another aspect of the invention, there is a system including a processor set, one or more computer readable storage media, and program instructions collectively stored on the one or more computer readable storage media. The program instructions are executable to: detect a task keyword related to an offloaded task of a task-giver; train a machine learning (ML) model using the task keyword related to the offloaded task; determine that the task keyword is similar to a historical task by utilizing the trained ML model; record a user input in response to determining that the task keyword is similar to the historical task; freeze an action execution during a pseudo action before a finality action is executed; provide the recorded user input to the task-giver and requesting approval from the task-giver; and execute the offloaded task by robotic process automation (RPA) in response to receiving approval from the task-giver.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to generating an ad-hoc pseudo-completion task for approval and, more particularly, to providing a user interface using a natural language processing (NLP) input to generate the ad-hoc pseudo-completion task for approval. Embodiments of the present invention preserve an offloading of a task while maintaining task control from a task requester using robotic process automation (RPA) and natural language processing (NLP). Embodiments of the present invention ensure that a user remains in control of a task while offloading the task to another user via NLP. Embodiments of the present invention allow for a task-giver to maintain control and ensure that a task is performed correctly when the task is offloaded to another user. In particular, embodiments of the present invention allow for offloading of tasks based on an NLP input while still maintaining control for the task-giver. Embodiments of the present invention provide a user interface (UI) that preserves an offloading of a task while also maintaining control of the task from the task-giver.

Aspects of the present invention include a method, system, and computer program product for infusing natural language offloaded tasks with a UI interruption and automation. For example, a computer-implemented method includes: ingesting a natural language query to offload a task and generate a pseudo action for an associated party to execute; capturing the pseudo action based on task mining and looking for finality keywords or an associated process to interrupt an execution; interjecting before a final step while recording preceding tasks to generate a reusable consumable task for a host or approving user; and collecting a set of commonly used jargon terms when building a customized data dictionary for a NLP module. Further, the computer-implemented method may also include recognizing a plurality of emojis used by meeting participants as an input, such as a thumbs up or a thumbs down. The computer-implemented method may also map the plurality of emojis to corresponding actions for task creation. In embodiments, the pseudo action comprises at least one action that a user performs through a computing device before a finality action (e.g., a done button, a submit button, or an ok button) is completed (e.g., one of the done button, the submit button, or the ok button is pressed).

Embodiments of the present invention provide RPA and natural language to preserve an offloading of a task while allowing a task-giver to maintain control. In comparison, conventional systems require the task-giver to offload a task to another user and also to give up control of the task to the another user. Embodiments of the present invention provide a process that allows for offloading of tasks based on an NLP input while still allowing the task-giver to maintain control. Embodiments of the present invention also provide a UI that is able to communicate with a module that preserves the offloading of a task while still maintaining control from the task-giver.

Embodiments of the present invention include a highly computationally efficient system, method, and computer program product for maintaining control of a task while offloading the task to another user via NLP. Accordingly, implementations of the present invention provide an improvement (i.e., technical solution) to a problem arising in the technical field of offloading computing tasks by communicating to another using through a computing device. In particular, embodiments of the present invention infuse natural language offloaded tasks with UI interruption to preserve control for a task-giver. Embodiments of the present invention also infuse natural language offloaded tasks with automation to provide a faster way of offloading tasks and preserving control for the task-giver. Embodiments of the present invention use a machine learning (ML) model to improve accuracy of task mining.

Implementations of the present invention are necessarily rooted in computer technology. For example, the step of training a ML model to improve accuracy of task mining is computer-based and cannot be performed in the human mind. Training and building the ML model is, by definition, performed by a computer and cannot practically be performed in the human mind (or with pen and paper) due to the complexity and massive amounts of calculations involved. For example, training and building the ML model in embodiments of the present invention may use machine learning to build and train the ML model using a captured task and business data to improve accuracy of task mining. In particular, training and building the ML model performs a large among of processing of the captured task and business data and modeling of parameters to train the ML model such that the ML model generates and outputs in real time (or near real time). In other words, the ML model is trained using a large amount of previously captured task data, business data, and other parameters such that the ML model is configured to output a similarity of a historical task with a current task in real-time. Given the scale and complexity of processing captured task and business data and modeling of parameters, it is simply not possible for the human mind, or for a person using pen and paper, to perform the number of calculations involved in training and/or building the ML model.

It should be understood that, to the extent implementations of the invention collect, store, or employ personal information provided by, or obtained from, individuals (for example, task-giver and task implementer), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
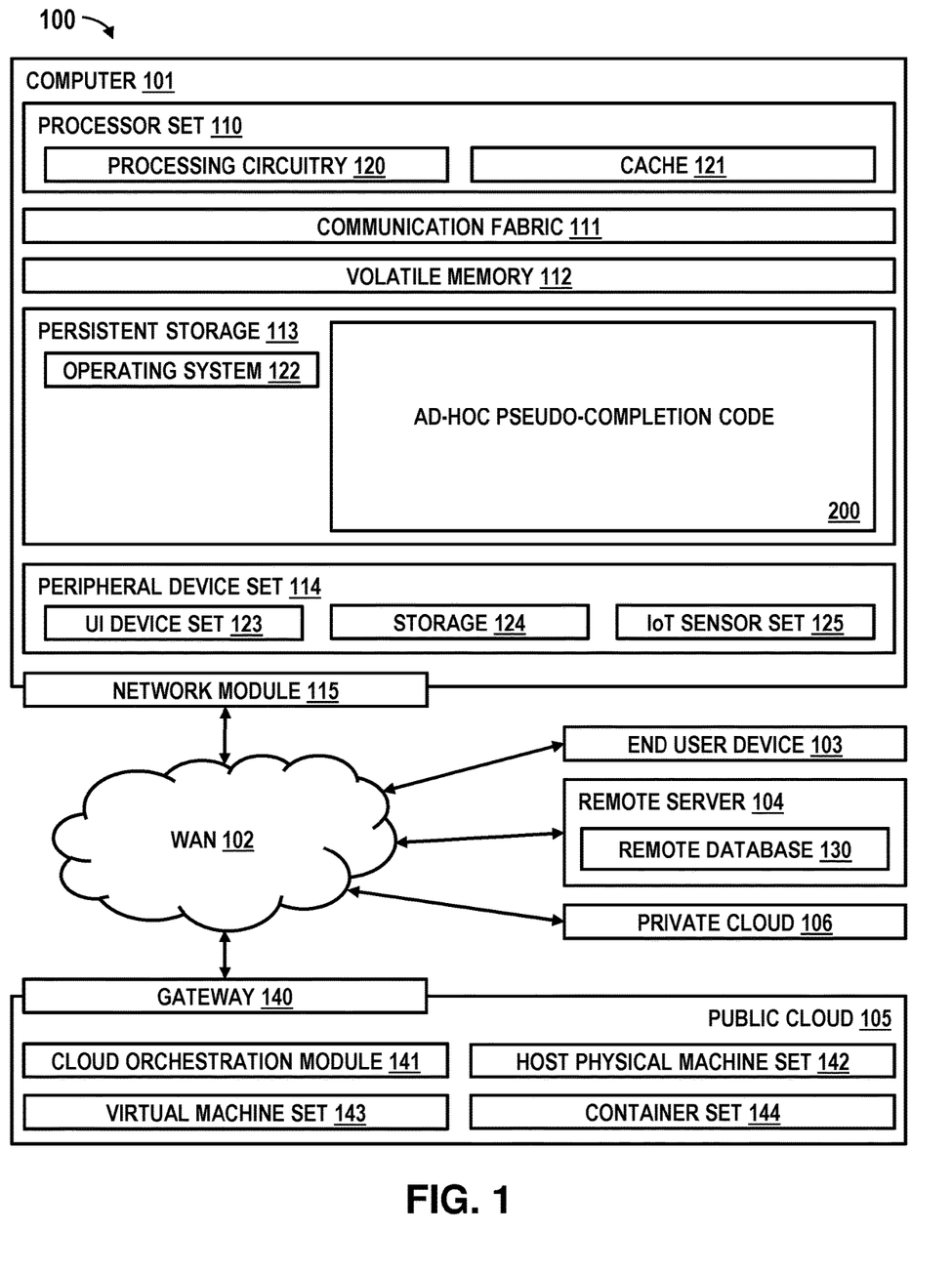
FIG. 1 depicts a computing environment according to an embodiment of the present invention.

Computing environment 100 contains an example of an environment for the execution of at least some of the computer code involved in performing the inventive methods, such as ad-hoc pseudo-completion code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
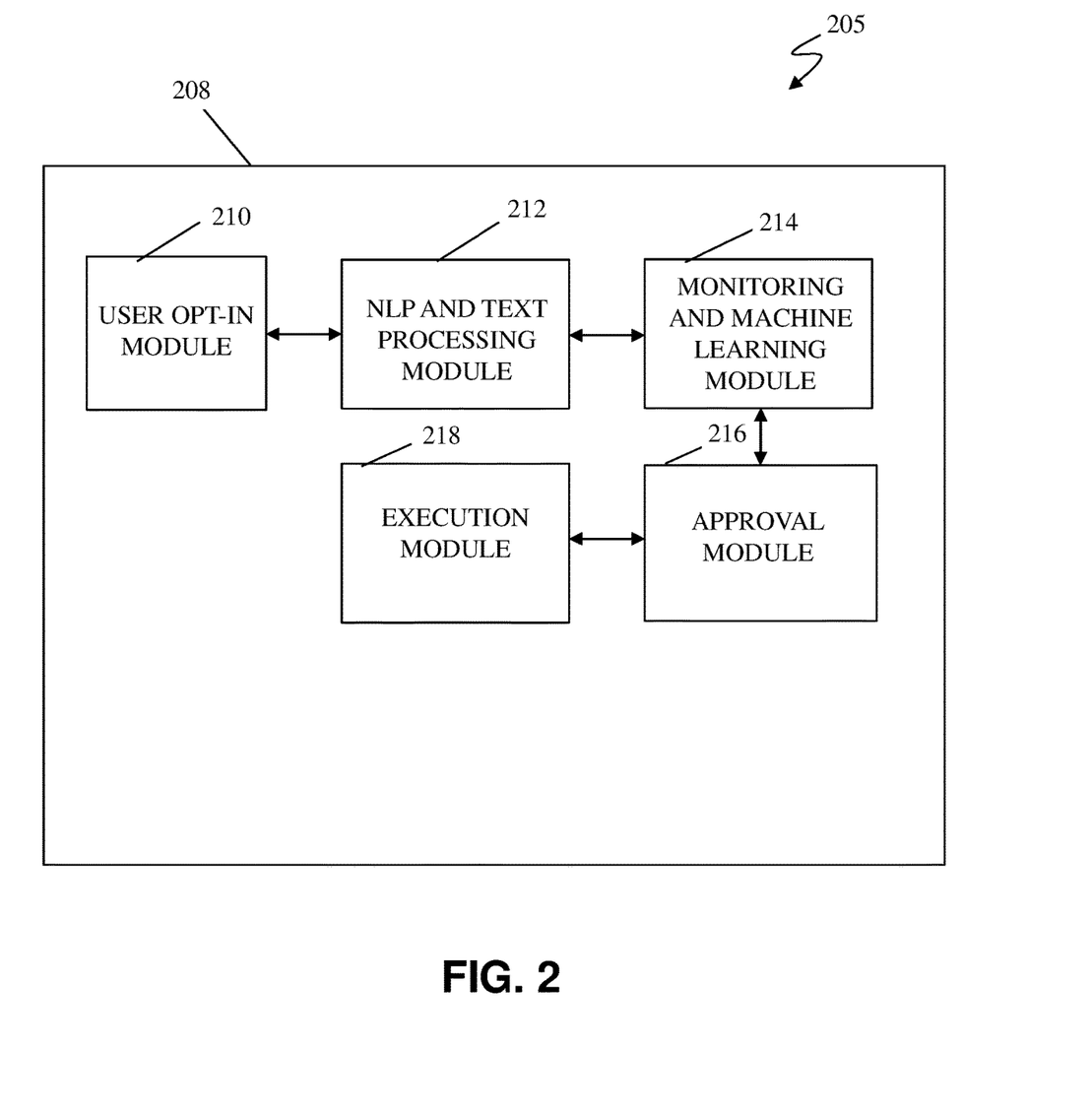
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes an ad-hoc pseudo-completion server 208, which may comprise one or more instances of the computer 101 of FIG. 1. In other examples, the ad-hoc pseudo-completion server 208 comprises one or more virtual machines or one or more containers running on one or more instances of the computer 101 of FIG. 1.

In embodiments, the ad-hoc pseudo-completion server 208 of FIG. 2 comprises a user opt-in module 210, a NLP and text processing module 212, a monitoring and machine learning module 214, an approval module 216, and an execution module 218, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The ad-hoc pseudo-completion server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, the user opt-in module 210 allows a user to opt-in to grant access to information of the user. In embodiments, the user may be at least one of a task-giver or a task-implementer (e.g., a user who receives an offloaded task from the task-giver). In further embodiments, the user opt-in module 210 allows the user to opt-in to grant access to a speech-to-text component, a conference context component, an electronic-meeting context component, a NLP component, and a text component of the NLP and text processing module 212 for obtaining the information of the user. The user opt-in module 210 communicates the opt-in of at least one of the task-giver and the task-implementer to the NLP and text processing module 212.

In embodiments, the NLP and text processing module 212 detects a desire of the task-giver to execute a task (either a previously executed task or a new task) via keyword analysis. In particular, the NLP and text processing module 212 captures the text via keyword analysis of a user-to-user offloaded request, such as "Logan, can you please submit an HR request for a new hire?" In further embodiments, the NLP and text processing module 212 monitors electronic meetings and collaborative meetings to detect a task keyword or an action request keyword from the user in response to receiving the opt-in of the task-giver. In embodiments, the detected task keyword corresponds with an offloaded task. The NLP and text processing module 212 communicates the opt-in of at least one of the task-giver and the task-implementer and the detected task keyword to the monitoring and machine learning module 214.

In embodiments, the monitoring and machine learning module 214 receives the opt-in of at least one of the task-giver and the task-implementer and the detected task keyword and monitors a computing device of the task-giver to find a pseudo action. As previously discussed, the pseudo action comprises at least one action that the task-giver performs through a computing device of the task-giver before a finality action (e.g., a virtual done button, a virtual submit button, or a virtual ok button) is completed (e.g., one of the virtual done button, the virtual submit button, or the virtual ok button is pressed by clicking a corresponding virtual button with a mouse pointer, touching the corresponding virtual button with a finger or stylus on a touchscreen interface, etc.) In embodiments, the monitoring and machine learning module 214 monitors the computing device of the task-giver to find the pseudo action in response to the monitoring and machine learning module 214 receiving the opt-in of the task-giver.

In embodiments, the monitoring and machine learning module 214 utilizes a keyword analysis, cosine similarity, and a machine learning (ML) model to determine if there is a historical task that is similar to the detected task keyword. In particular, the monitoring and machine learning module 214 utilizes the keyword analysis, the cosine similarity, and the ML model to determine if there is a historical task in a task mining corpus that is similar to the detected task keyword. The monitoring and machine learning module 214 communicates with the task mining corpus such that the task mining corpus includes all historical tasks that have been previously performed or executed in the ad-hoc pseudo-completion server 208 and a current task corresponding to the detected task keyword.

In embodiments, the monitoring and machine learning module 214 includes the ML model which is trained using the task mining corpus (e.g., both historical tasks and the current task) to improve accuracy of determining whether the historical task is similar to the detected task keyword. As an example, the ML model may be trained by utilizing logistic regression, support vector machines, linear regression, boosting algorithms, and reinforcement learning. However, embodiments are not limited to these examples, and the ML model may use different algorithms for improving accuracy of determining whether the historical task is similar to the detected task keyword.

In further embodiments, the monitoring and machine learning module 214 records a user input using a web browser or an operating system (OS) level application recorder in response to determining that there is a historical task that is similar to the detected task keyword. In particular, the monitoring and machine learning module 214 records input data and business data which the user inputs into a user interface (UI) using the web browser of the OS level application recorder in response to determining that there is a historical task that is similar to the detected task keyword. In further embodiments, the monitoring and machine learning module 214 records input data and business data which the user inputs into the UI using a camera in response to determining that there is a historical task that is similar to the detected task keyword. In this scenario, the monitoring and machine learning module 214 is able to determine a finality action of the detected task keyword based on a similarity to a finality action of the historical task.

In embodiments, the monitoring and machine learning module 214 captures task and business data that a user interacts with in at least one of a browser site, an OS level, an application level, etc., of a computing device, in response to determining that there is no historical task that is similar to the detected task keyword. In further embodiments, the monitoring and machine learning module 214 records input data and business data which the user inputs into the UI using a camera, software on the computing device of the task-implementer, etc., of a computing device in response to determining that there is no historical task that is similar to the detected task keyword. In embodiments, the monitoring and machine learning module 214 also either automatically detects a finality action or receives a manual user notification of the finality action. In particular, the monitoring and machine learning module 214 automatically detects the finality action by using optical character recognition (OCR), image recording, or webpage processing. In embodiments, the finality action may be completed by pressing at least one of a done button, a submit button, an ok button, etc. However, the finality action is not limited to these examples and may be pre-programmed in the ad-hoc pseudo-completion server 208 to be a different action. In other embodiments, the monitoring and machine learning module 214 receives the manual user notification of the finality action of the user by the user pressing a stop recording button which stops recording the user interacting with the at least one of the browser site, the OS level, the application level, etc. However, the manual user notification of the finality action is not limited to this example and may be pre-programmed in the ad-hoc pseudo-completion server 208 to be a user performing a different step on the computing device of the task-implementer.

In embodiments, the monitoring and machine learning module 214 interrupts or freezes action execution during the pseudo action before the finality action is executed. Accordingly, the monitoring and learning module 214 prevents full execution of the offloaded task by the task-implementer until approval is given by the task-giver. The monitoring and machine learning module 214 sends the recorded input and business data to the approval module 216.

In FIG. 2, and in accordance with aspects of the present invention, the approval module 216 receives the recorded input and business data and provides a user notification of the pseudo action before the finality action is executed to the task-giver. In particular, the user notification of the pseudo action before the finality action is executed may comprise an overlay notifying the task-giver of pseudo completion. Further, the approval module 216 provides the recorded input and business data to the task-giver and requests approval of the task-giver using a pre-filled user interface (UI), a video recording, or another manner of sharing a context of the business data and form completion. In an example, the approval module 216 requests approval of the task-giver by allowing the task-giver to click the interrupted or frozen action execution (e.g., a button which has been rendered inactive) by an overlapping or overwriting function to allow execution of the offloaded task. In embodiments, once the approval module 216 receives approval from a computing device of the task-giver, the approval module 216 sends the approval from the task-giver to the execution module 218.

In FIG. 2, and in accordance with aspects of the present invention, the execution module 218 then utilizes the computing device of the task-giver to execute the offloaded task via robotic process automation (RPA). In particular, the execution module executes the finality action to complete the offloaded task via an RPA bot. As an example, the RPA bot performs an actual submission of the submit button which had been previously interrupted or frozen before approval by the task-giver. In other embodiments, the execution module executes the offloaded task via RPA using a virtual machine (VM) instead of taking over the computing device of the task-giver.

Figure 3:
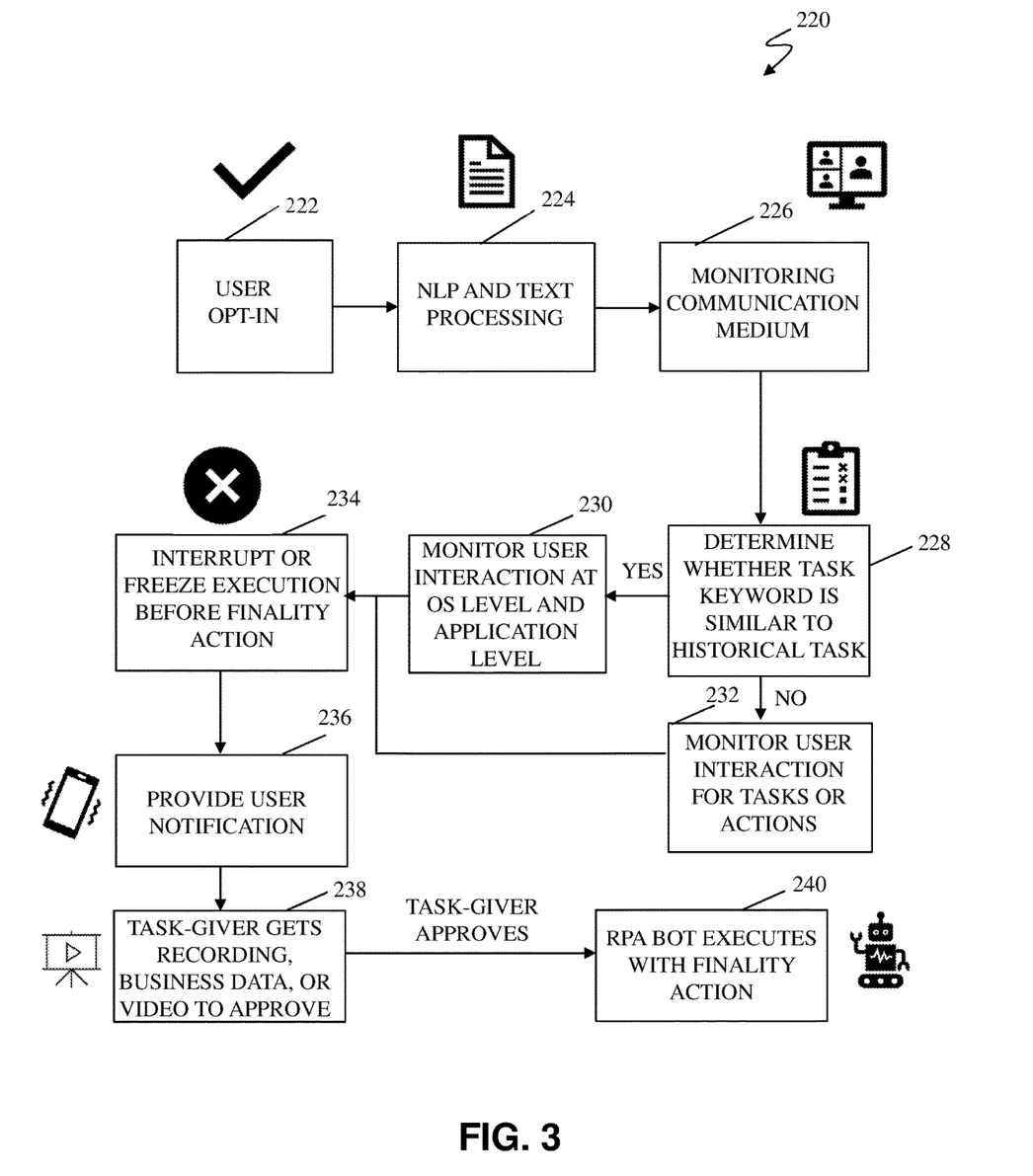
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

In the flowchart 220, at step 222, the system allows, by the user opt-in module 210, a user to opt-in to grant access to information of the user. At step 224, the system performs, by the NLP and text processing module 212, NLP and text processing to obtain the information of the user. At step 226, the system monitors, by the NLP and text processing module 212, a communication medium (e.g., electronic meeting and collaborative meeting) to detect a task keyword which corresponds with an offloaded task of a task-giver. At step 228, the system determines, by the monitoring and machine learning module 214, whether the task keyword is similar to a historical task.

In the flowchart 220, at step 230, the system monitors, at the monitoring and machine learning module 214, a user interaction at an operating system (OS) level and application level in response to determining that there is the historical task that is similar to the task keyword. At step 232, the system monitors, at the monitoring and machine learning module 214, user interaction for tasks or actions through at least one of a browser side, an OS level, an application level, etc. At step 234, the system interrupts or freezes, at the monitoring and machine learning module 214, execution by pseudo action before the finality action is executed.

In the flowchart 220, at step 236, the system provides, at the approval module 216, user notification of the pseudo action before the finality action to the task-giver. At step 238, the system provides, at the approval module 216, recording, business data, or video for approval of the task-giver. At step 240, the system executes, at the execution module 218, the finality action to complete the offloaded task via an RPA bot.

Figure 4:
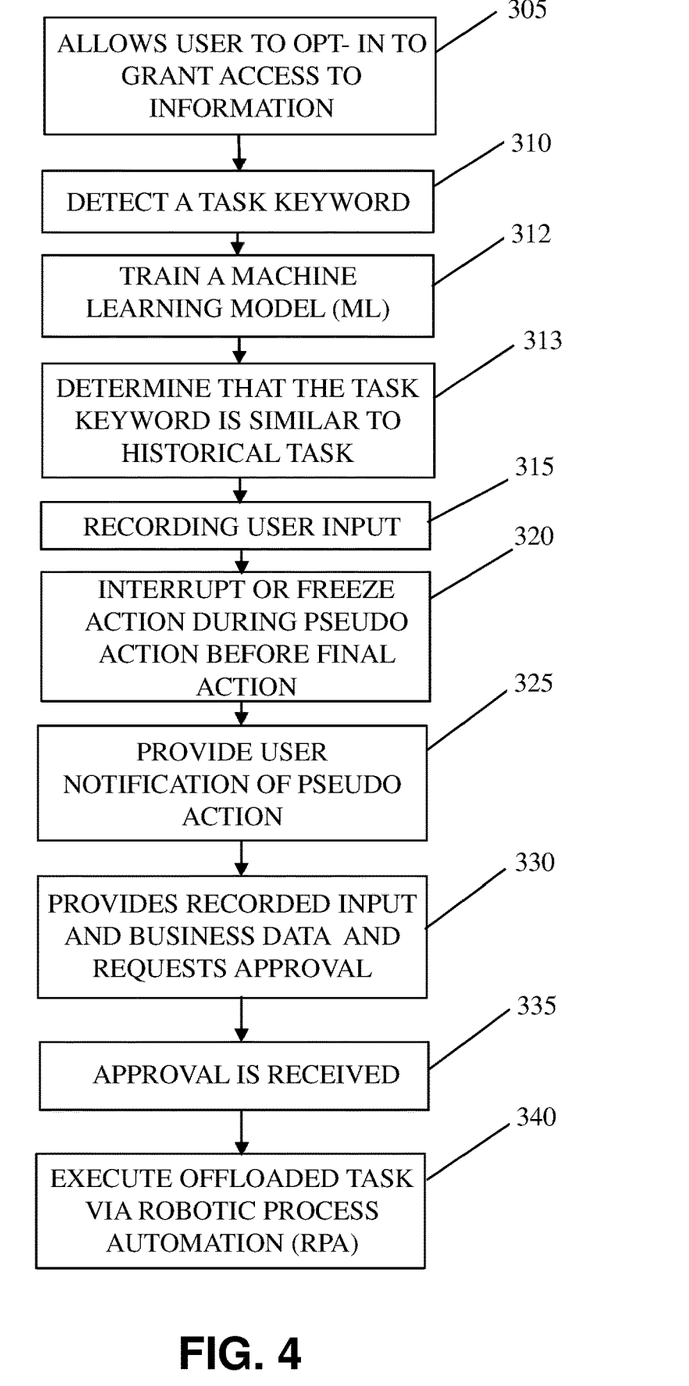
FIG. 4 shows another flowchart of an exemplary method in accordance with aspects of the present invention.

FIG. 4 shows another flowchart of an exemplary method in accordance with aspects of the present invention. Steps of the method may be carried out in the environment of FIG. 2 and are described with reference to elements depicted in FIG. 2.

At step 305, the system allows, by the user opt-in module 210, a user to opt-in to grant access to information of the user. In embodiments, and as described with respect to FIG. 2, the user may be at least one of a task-giver or a task-implementer (e.g., a user who receives an offloaded task from the task-giver).

At step 310, the system detects, by the NLP and text processing module 212, a task keyword of a task-giver. In embodiments, and as described with respect to FIG. 2, the NLP and text processing module 212 monitors electronic meetings and collaborative meetings to detect the task keyword related to an offloaded task in response to the task-giver opting-in to grant access to the information.

At step 312, the system trains, by the monitoring and machine learning model 214, the ML model using the task keyword related to the offloaded task. In embodiments and as described with respect to FIG. 2, the ML model is trained using the task mining corpus (e.g., both historical task and the offloaded task) to improve accuracy of determine whether historical task is similar to the detected task keyword.

At step 313, the system determines, by the monitoring and machine learning module 214, that the task keyword is similar to a historical task. In embodiments, and as described with respect to FIG. 2, the monitoring and machine learning module 214 utilizes a keyword analysis, a co-sine similarity, and a trained machine learning (ML) model to determine that the task keyword is similar to the historical task.

At step 315, the system records, by the monitoring and machine learning module 214, a user input using a web browser or an operating system (OS) level application recorder in response to determining that the task keyword is similar to the historical task. In embodiments, and as described with respect to FIG. 2, the monitoring and machine learning module 214 is able to determine a finality action of the detected task keyword based on a similarity to a finality action of the historical task.

At step 320, the system interrupts or freezes, by the monitoring and machine learning module 214, an action execution by pseudo action before the finality action is executed. In embodiments and as described with respect to FIG. 2, the monitoring and machine learning module 214 sends the recorded input and business data to the approval module 216.

At step 325, the system provides, by the approval module 216, a user notification of the pseudo action to the task-giver before the finality action is executed. In embodiments and as described with respect to FIG. 2, the user notification of the pseudo action before the finality action is executed may comprise an overlay notifying the task-giver of pseudo completion.

At step 330, the system provides, by the approval module 216, the recorded input and business data to the task-giver and requests approval of the task-giver. In embodiments and as described with respect to FIG. 2, the approval of the task-giver may be given using a pre-filled user interface (UI), a video recording, or another manner of sharing a context of the business data and form completion via a computing device of the task-giver.

At step 335, the system receives, by the approval module 216, approval from the task-giver. In embodiments and as described with respect to FIG. 2, the approval module 216 sends the approval from the task-giver to the execution module 218.

At step 340, the system executes, by the execution module 218, an offloaded task via robotic process automation (RPA). In embodiments and as described with respect to FIG. 2, the RPA bot performs an actual submission of the submit button which has been previously interrupted or frozen before approval by the task-giver.

Figure 5:
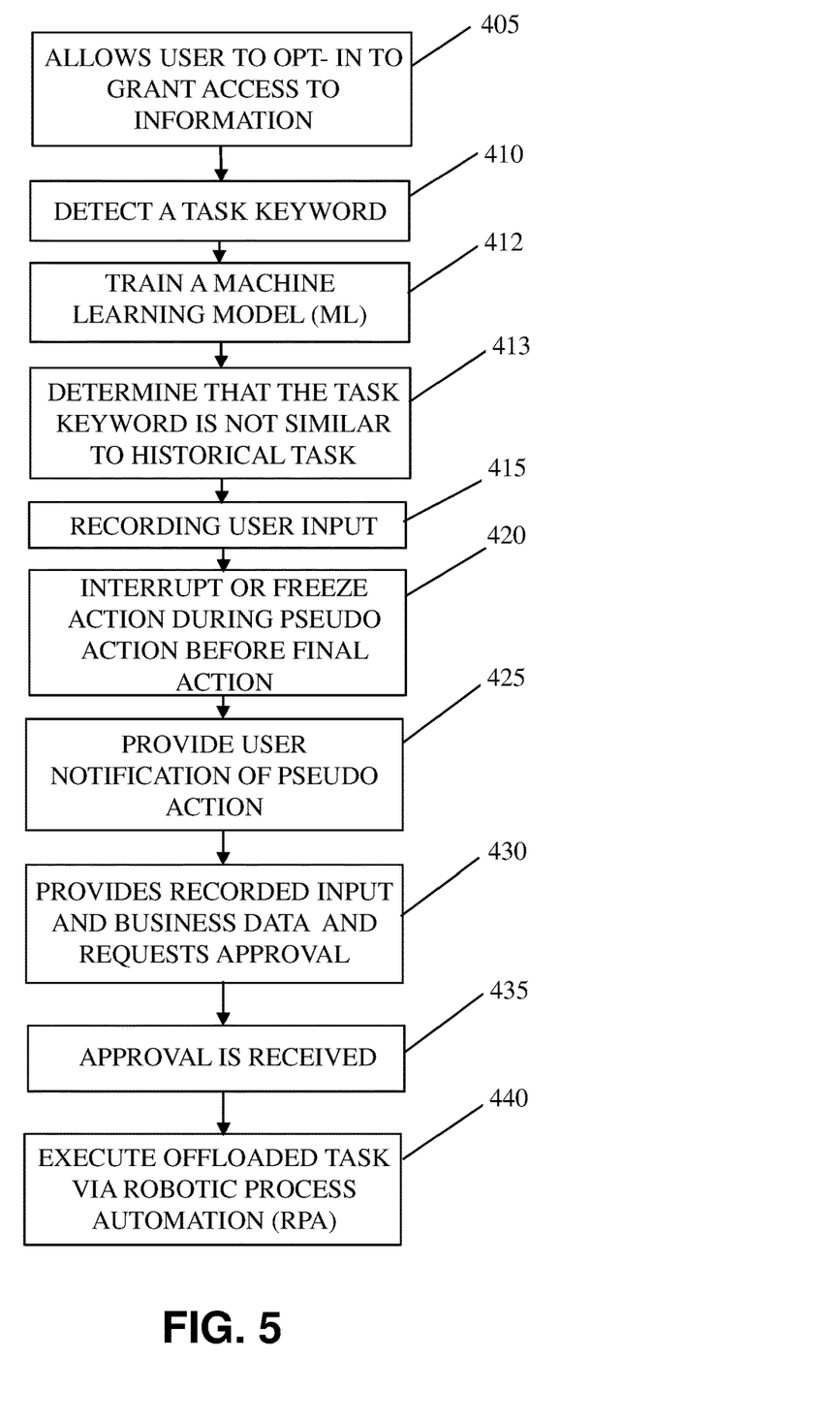
FIG. 5 shows another flowchart of an exemplary method in accordance with aspects of the present invention.

FIG. 5 shows a flowchart of an exemplary method in accordance with aspects of the present invention. Steps of the method may be carried out in the environment of FIG. 2 and are described with reference to elements depicted in FIG. 2.

At step 405, the system allows, by the user opt-in module 210, a user to opt-in to grant access to information of the user. In embodiments, and as described with respect to FIG. 2, the user may be at least one of a task-giver or a task-implementer (e.g., a user who receives an offloaded task from the task-giver).

At step 410, the system detects, by the NLP and text processing module 212, a task keyword of a task-giver. In embodiments, and as described with respect to FIG. 2, the NLP and text processing module 212 monitors electronic meetings and collaborative meetings to detect the task keyword related to an offloaded task in response to the task-giver opting-in to grant access to the information.

At step 412, the system trains, by the monitoring and machine learning model 214, the ML model using the task keyword related to the offloaded task. In embodiments and as described with respect to FIG. 2, the ML model is trained using the task mining corpus (e.g., both the historical tasks and the offloaded task) to improve accuracy of determining whether the historical task is similar to the detected task keyword.

At step 413, the system determines, by the monitoring and machine learning module 214, that the task keyword is not similar to a historical task. In embodiments, and as described with respect to FIG. 2, the monitoring and machine learning module 214 utilizes a keyword analysis, a co-sine similarity, and a trained machine learning (ML) model to determine that the task keyword is not similar to the historical task. In embodiments of FIG. 5, step 413 is different from step 313 of FIG. 4 because the monitoring and machine learning module 214 determines that the task keyword is not similar to the historical task. In contrast, the monitoring and machine learning module 214 in step 313 of FIG. 4 determines that the task keyword is similar to the historical task.

At step 415, the system records, by the monitoring and machine learning module 214, a user input which is input to at least one of a browser site, an operating system (OS) level, an application level, etc., in response to determining that the task keyword is not similar to the historical task. In embodiments, and as described with respect to FIG. 2, the monitoring and machine learning module 214 is able to either automatically detect a finality action or receive a manual user notification of the finality action.

At step 420, the system interrupts or freezes, by the monitoring and machine learning module 214, an action execution by pseudo action before the finality action is executed. In embodiments and as described with respect to FIG. 2, the monitoring and machine learning module 214 sends the recorded input and business data to the approval module 216.

At step 425, the system provides, by the approval module 216, a user notification of the pseudo action to the task-giver before the finality action is executed. In embodiments and as described with respect to FIG. 2, the user notification of the pseudo action before the finality action is executed may comprise an overlay notifying the task-giver of pseudo completion.

At step 430, the system provides, by the approval module 216, the recorded input and business data to the task-giver and requests approval of the task-giver. In embodiments and as described with respect to FIG. 2, the approval of the task-giver may be given using a pre-filled user interface (UI), a video recording, or another manner of sharing a context of the business data and form completion via a computing device of the task-giver.

At step 435, the system receives, by the approval module 216, approval from the task-giver. In embodiments and as described with respect to FIG. 2, the approval module 216 sends the approval from the task-giver to the execution module 218.

At step 440, the system executes, by the execution module 218, an offloaded task via robotic process automation (RPA). In embodiments and as described with respect to FIG. 2, the RPA bot performs an actual submission of the submit button which has been previously interrupted or frozen before approval by the task-giver.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting, by a processor set, a task keyword related to an offloaded task of a task-giver;
   training, by the processor set, a machine learning (ML) model using the task keyword;
   determining, by the processor set, that the task keyword is similar to a historical task by utilizing the trained ML model;
   recording, by the processor set, a user input in response to determining that the task keyword is similar to the historical task;
   freezing, by the processor set, an action execution during a pseudo action before a finality action is executed;

providing, by the processor set, the recorded user input to the task-giver and requesting approval from the task-giver; and executing, by the processor set, the offloaded task using robotic process automation (RPA) in response to receiving the approval from the task-giver.

2. The computer-implemented method of claim 1, further comprising receiving an opt-in from at least one of a task-giver and a task-implementer to grant access to information.

3. The computer-implemented method of claim 2, wherein the detecting the task keyword related to the offloaded task of the task-giver occurs in response to the task-giver granting access to the information via the opt-in.

4. The computer-implemented method of claim 1, wherein the detecting the task keyword comprises monitoring an electronic meeting for the task keyword.

5. The computer-implemented method of claim 1, wherein the determining that the task keyword is similar to the historical task further comprises utilizing a keyword analysis, and a cosine similarity to determine that the task keyword is similar to the historical task.

6. The computer-implemented method of claim 1, wherein the recording the user input comprises recording the user input using a web browser or an operating system (OS) level application recorder.

7. The computer-implemented method of claim 1, wherein the receiving the approval from the task-giver comprises receiving a pre-filled user interface (UI) via a computing device of the task-giver which indicates the approval from the task-giver.

8. The computer-implemented method of claim 1, wherein the receiving the approval from the task-giver comprises receiving a video recording via a computing device of the task-giver which indicates the approval from the task-giver.

9. The computer-implemented method of claim 1, wherein the pseudo action comprises at least one action that is performed through a computing device before the finality action is executed.

10. The computer-implemented method of claim 1, wherein the RPA comprises utilizing an RPA bot.

11. The computer-implemented method of claim 10, wherein the RPA bot performs submission of a submit button which has been previously interrupted before the approval by the task-giver.

12. A computer program product comprising one or more computer readable storage media having program instructions collectively stored on the one or more computer readable storage media, the program instructions executable to:
   detect a task keyword related to an offloaded task of a task-giver;
   train a machine learning (ML) model using the task keyword;
   determine that the task keyword is not similar to a historical task by utilizing the trained ML model;
   record a user input in response to determining that the task keyword is not similar to the historical task;
   freeze an action execution during a pseudo action before a finality action is executed;
   provide the recorded user input to the task-giver and requesting approval from the task-giver; and
   execute the offloaded task using robotic process automation (RPA) in response to receiving the approval from the task-giver.

13. The computer program product of claim 12, further comprising receiving an opt-in from at least one of a task-giver and a task-implementer to grant access to information.

14. The computer program product of claim 13, wherein the detecting the task keyword related to the offloaded task of the task-giver occurs in response to the task-giver granting access to the information via the opt-in.

15. The computer program product of claim 12, wherein the detecting the task keyword comprises monitoring an electronic meeting for the task keyword.

16. The computer program product of claim 12, wherein the determining that the task keyword is not similar to the historical task further comprises utilizing a keyword analysis, a co-sine similarity to determine that the task keyword is not similar to the historical task.

17. The computer program product of claim 12, wherein the recording the user input comprises recording the user input using at least one of a browser site, an operating system (OS) level, an application level.

18. The computer program product of claim 12, wherein the receiving the approval from the task-giver comprises receiving a pre-filled user interface (UI) via a computing device of the task-giver which indicates the approval from the task-giver.

19. The computer-implemented method of claim 12, wherein the RPA comprises utilizing an RPA bot.

20. A system comprising: a processor set, one or more computer readable storage media, and program instructions collectively stored on the one or more computer readable storage media, the program instructions executable to:
   detect a task keyword related to an offloaded task of a task-giver;
   train a machine learning (ML) model using the task keyword;
   determine that the task keyword is similar to a historical task by utilizing the trained ML model;
   record a user input in response to determining that the task keyword is similar to the historical task;
   freeze an action execution during a pseudo action before a finality action is executed;
   provide the recorded user input to the task-giver and requesting approval from the task-giver; and
   execute the offloaded task using robotic process automation (RPA) in response to receiving the approval from the task-giver.

* * * * *